(12) United States Patent
Ahluwalia

(10) Patent No.: US 11,888,988 B2
(45) Date of Patent: Jan. 30, 2024

(54) TWO-FACTOR AUTHENTICATION BASED ON COMPUTATION METHOD TO DERIVE PROXY PASSWORD

(71) Applicant: KYNDRYL, INC., New York, NY (US)

(72) Inventor: Gurpreet Singh Ahluwalia, Uttarakhand (IN)

(73) Assignee: KYNDRYL, INC, New York, NY (US)

(*) Notice: Subject to any disclaimer, the term of this patent is extended or adjusted under 35 U.S.C. 154(b) by 150 days.

(21) Appl. No.: 17/380,499

(22) Filed: Jul. 20, 2021

(65) Prior Publication Data
US 2023/0021765 A1 Jan. 26, 2023

(51) Int. Cl.
*H04L 9/32* (2006.01)

(52) U.S. Cl.
CPC .................... *H04L 9/3226* (2013.01)

(58) Field of Classification Search
CPC .................................................. H04L 9/3226
See application file for complete search history.

(56) References Cited

U.S. PATENT DOCUMENTS

| | | | | |
|---|---|---|---|---|
| 2001/0037463 A1* | 11/2001 | Salta | ......................... | H04L 9/40 726/28 |
| 2006/0143450 A1* | 6/2006 | Airody Udupa | ........ | G06F 21/31 713/168 |
| 2007/0124601 A1* | 5/2007 | Singh | ..................... | G06F 21/62 713/182 |
| 2015/0033303 A1* | 1/2015 | VanBlon | ................ | G06F 21/46 726/6 |
| 2017/0006017 A1* | 1/2017 | Mohan | .................... | G06F 21/31 |
| 2017/0337368 A1 | 11/2017 | Sang | | |
| 2019/0392125 A1 | 12/2019 | Lee | | |

FOREIGN PATENT DOCUMENTS

CN 107548542 B 10/2020

OTHER PUBLICATIONS

Ali, et al., "A Simple and Secure Reformation-Based Password Scheme", IEEE Access, vol. 9, Digital Object Identifier: 10.1109/ACCESS.2020.3049052, Jan. 2021, 20 pgs.

* cited by examiner

*Primary Examiner* — Henry Tsang
(74) *Attorney, Agent, or Firm* — Dan Housley; Andrew M. Calderon; Calderon Safran & Cole, P.C

(57) ABSTRACT

Technology for setting a first password based on a password precursor or setting a second password (in a multi-factor authentication system). The password precursor (for example, a number or alphanumeric string) can be converted to the first password by a set of operation(s). Similarly, the first password can be converted into a second password by a set of operations. The set of operations may include mathematical operations and/or alphanumeric string operations.

20 Claims, 7 Drawing Sheets

SCREEN SHOT DISPLAY GENERATED BY A COMPUTER

USER: 1
FIRST PASSWORD: PASSWORD
SET OF OPERATIONS: REVERSE CHARACTER STRING
SECOND PASSWORD: DROWSSAP

USER: 2
FIRST PASSWORD: 92
SET OF OPERATIONS: CONVERT TO HEXADECIMAL
SECOND PASSWORD: 5C

USER: 3
PASSWORD PRECURSOR: PASSWORD
SET OF OPERATIONS:
- REPLACE FIRST CHARACTER WITH FIRST LETTER OF CURRENT MONTH VARIABLE
- ADD DAY OF MONTH TO END OF STRING

PASSWORD: JASSWORD7 (FOR 07 JUNE VERSION)

FIG. 4

TWO-FACTOR AUTHENTICATION BASED ON COMPUTATION METHOD TO DERIVE PROXY PASSWORD

BACKGROUND

The present invention relates generally to the field of computer security, and more particularly to password generation. The title of this document uses the term "proxy password." Readers should understand that, in computer technical terms the word "proxy password" has a specialized meaning in context of passwords utilized by proxy servers. This specialized proxy server related meaning, is different than the more familiar general meaning of the word "proxy." For purposes of this document "proxy" and "proxy password" are to be understood under the generalized, traditional meaning of the word "proxy" and not under the specialized meaning connected to proxy servers. For purposes of a document, a "proxy password" is hereby defined to mean a password, or set of multiple passwords, that represent a user for computer security purposes. As a simple example, Jane Doe's proxy password (in this example, janedoespassword-july2021%) represents to Jane Doe's bank that the bank's computers are indeed communicating, ultimately, with real person of Jane Doe. In common parlance, "proxy passwords" are sometimes simply referred to as "a password" or as a set of passwords, thereby indicating in the latter case that multiple passwords will be required to complete the representation of the individual user by proxy.

A preliminary note regarding the word "proxy" will now be made in this paragraph. In in the specialized field of proxy servers, the word "proxy password" has a specialized meaning that is not relevant to the various passwords discussed throughout this document. For purposes of this document, "proxy" is hereby defined to mean that a proxy password (may also be referred to herein as a second password) does not have its own distinct identity but it is derived by applying a computation logic on the main/first password.

The Wikipedia entry for "two-factor authentication" (as of May 21, 2021) states as follows: "Multi-factor authentication (MFA; encompassing Two-factor authentication or 2FA, along with similar terms) is an electronic authentication method in which a device user is granted access to a website or application only after successfully presenting two or more pieces of evidence (or factors) to an authentication mechanism: knowledge (something only the user knows), possession (something only the user has), and inherence (something only the user is). MFA protects the user from an unknown person trying to access their data such as personal ID details or financial assets. A third-party authenticator (TPA) app enables two-factor authentication, usually by showing a randomly generated and constantly refreshing code to use for authentication. Factors[.] Authentication takes place when someone tries to log into a computer resource (such as a network, device, or application). The resource requires the user to supply the identity by which the user is known to the resource, along with evidence of the authenticity of the user's claim to that identity. Simple authentication requires only one such piece of evidence (factor), typically a password. For additional security, the resource may require more than one factor—multi-factor authentication, or two-factor authentication in cases where exactly two pieces of evidence are to be supplied. The use of multiple authentication factors to prove one's identity is based on the premise that an unauthorized actor is unlikely to be able to supply the factors required for access. If, in an authentication attempt, at least one of the components is missing or supplied incorrectly, the user's identity is not established with sufficient certainty and access to the asset (e.g., a building, or data) being protected by multi-factor authentication then remains blocked. The authentication factors of a multi-factor authentication scheme may include: [1.] Something the user has: Some physical object in the possession of the user, such as a security token (USB stick), a bank card, a key, etc. [2.] Something the user knows: Certain knowledge only known to the user, such as a password, PIN, TAN, etc. [3.] Something the user is: Some physical characteristic of the user (biometrics), such as a fingerprint, eye iris, voice, typing speed, pattern in key press intervals, etc. [4.] Somewhere the user is . . . " (footnote(s) omitted)

The Wikipedia entry for "password" (as of May 21, 2021) states as follows: "A password, sometimes called a passcode, is secret data, typically a string of characters, usually used to confirm a user's identity. Traditionally, passwords were expected to be memorized, but the large number of password-protected services that a typical individual accesses can make memorization of unique passwords for each service impractical. Using the terminology of the NIST Digital Identity Guidelines, the secret is held by a party called the claimant while the party verifying the identity of the claimant is called the verifier. When the claimant successfully demonstrates knowledge of the password to the verifier through an established authentication protocol, the verifier is able to infer the claimant's identity. In general, a password is an arbitrary string of characters including letters, digits, or other symbols. If the permissible characters are constrained to be numeric, the corresponding secret is sometimes called a personal identification number (PIN). Despite its name, a password does not need to be an actual word; indeed, a non-word (in the dictionary sense) may be harder to guess, which is a desirable property of passwords. A memorized secret consisting of a sequence of words or other text separated by spaces is sometimes called a passphrase. A passphrase is similar to a password in usage, but the former is generally longer for added security." (footnote(s) omitted)

SUMMARY

According to an aspect of the present invention, there is a method, computer program product and/or system that performs the following operations (not necessarily in the following order): (i) receiving a first password for a first user, with the first password including numbers, alphanumeric characters and/or non-alphanumeric characters; (ii) receiving a set of operation(s) that can be applied to the first password to change it into a second password for the first user; (iii) applying, by machine logic, the set of operation(s) to the first password to obtain the second password; (iv) presenting a user interface to the first user that prompts the user to enter the first and second passwords; (v) receiving user input from the first user through the user interface; (vi) determining that the user input is indicative of a correct entry of the first password and a correct entry of the second password; and (vii) responsive to the determination that the user input is indicative of a correct entry of the first password and a correct entry of the second password, allowing the first access to a first protected resource.

BRIEF DESCRIPTION OF THE DRAWINGS

FIG. 4 is a screenshot view generated by the first embodiment system;

DETAILED DESCRIPTION

Figure 1:
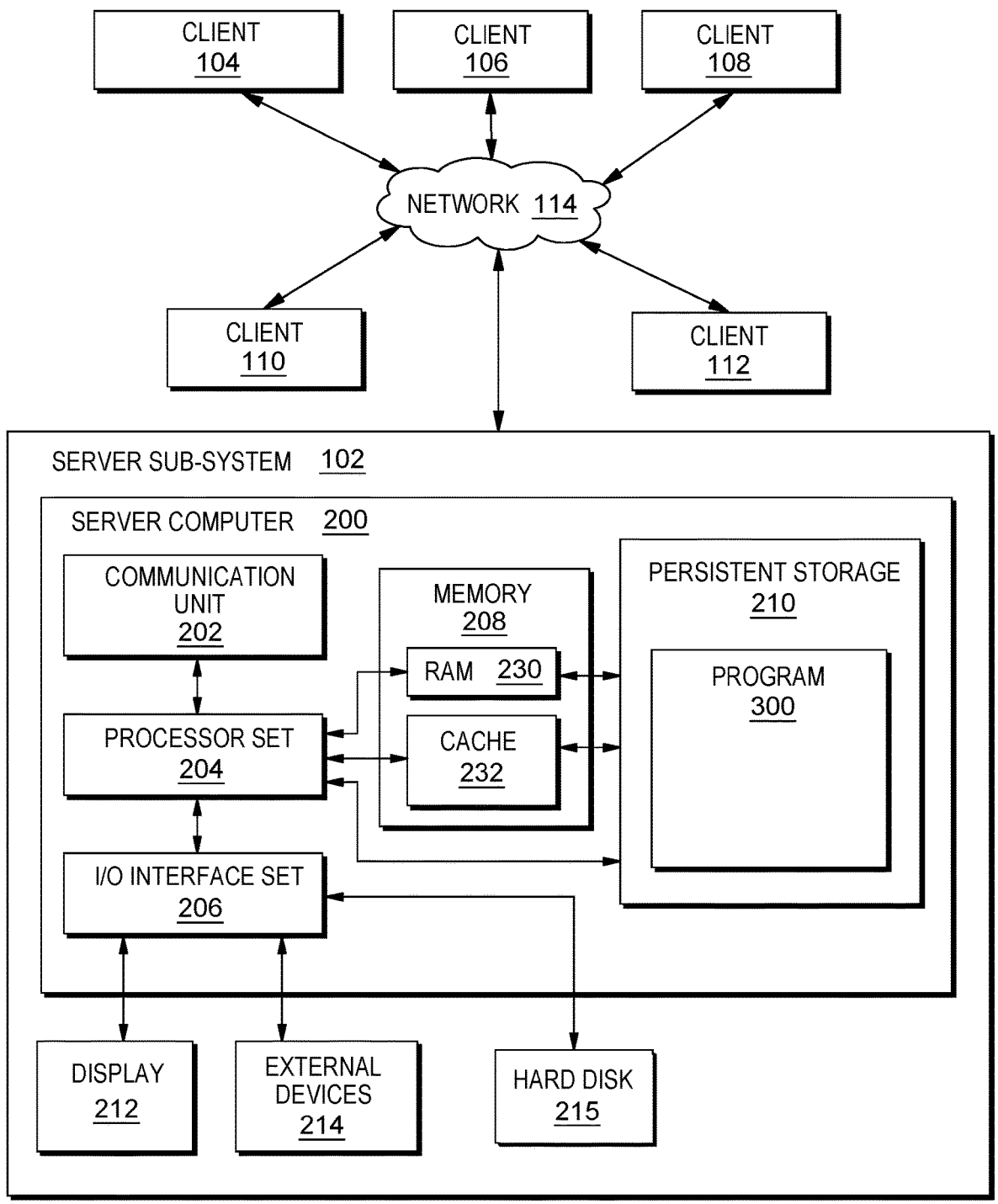
FIG. 1 is a block diagram view of a first embodiment of a system according to the present invention.

In some embodiments, a password is generated by performing a pre-determined set of operations (for example, addition by 1) to an initial string (called a first password or a password precursor, depending upon context). The newly generated password can be used as a primary password, or as one of multiple passwords in a multi-factor authentication system. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
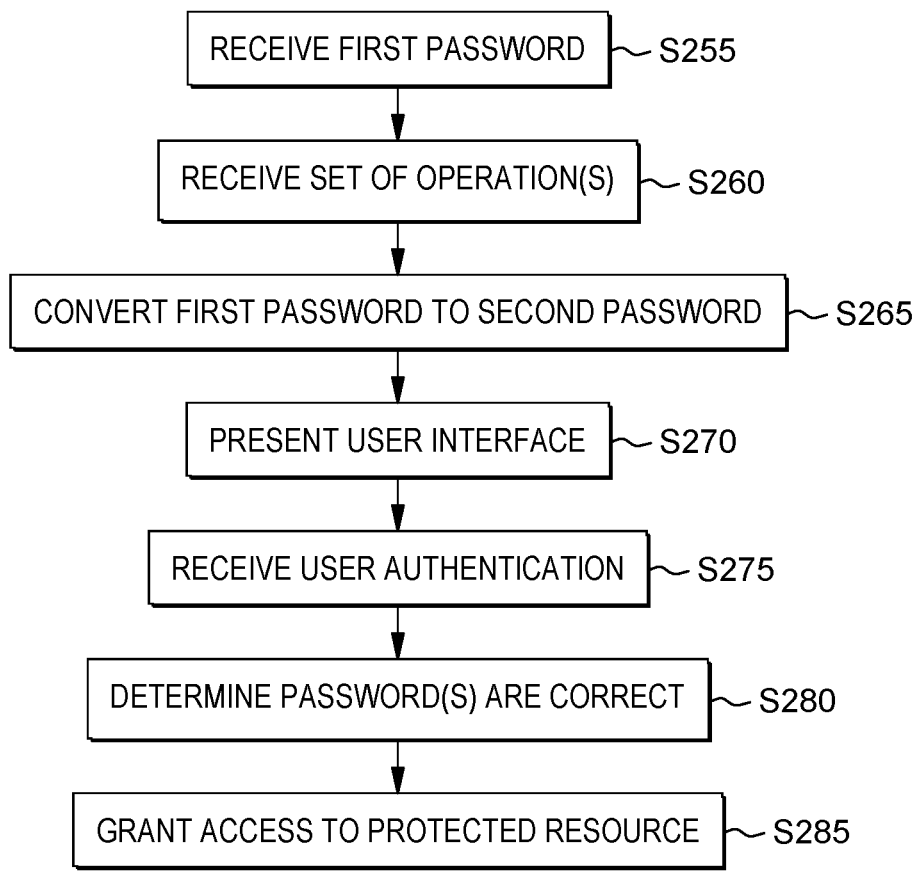
FIG. 2 is a flowchart showing a first embodiment method performed, at least in part, by the first embodiment system.
Figure 3:
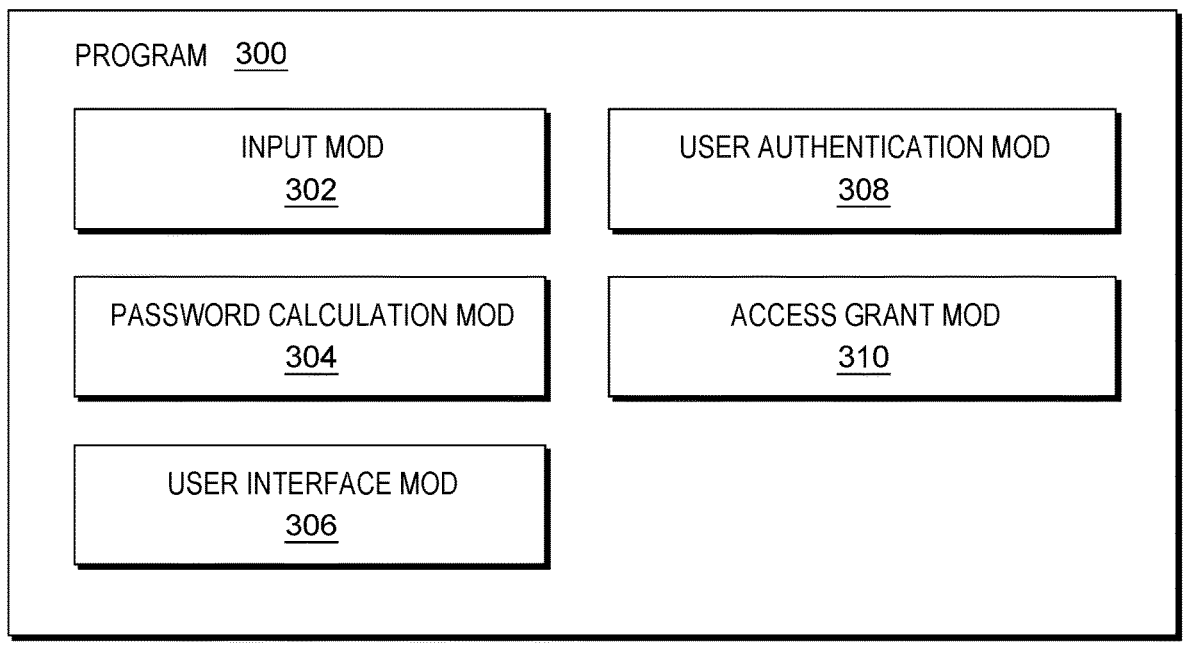
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where input module ("mod") 302 receives a string of characters from one of the client subsystems through network 114. In the three examples that will be discussed in this subsection, the example initial input strings are as follows: (i) PASSWORD (sent by user 1 of client subsystem 104, see also screenshot 400 of FIG. 4); (ii) 92 (sent by the user 2 of client system 106 at a different time); and (iii) PASSWORD (sent by user 3 of client subsystem 108 at a still different user instantiation). In some embodiments, non-alphanumeric characters, like emoji characters or symbol type characters (for example, a dollar sign) can be included in the input string. In embodiments where this operation is helping to set up for determination of a second password in a two password authentication systems: (i) the initial password may be used as one of the passwords in a multi-password authentication system; and (ii) the initial input string is called a "password" or a "first password." In embodiments where there is only one password (specifically the one that will be determined by the operations discussed below) then this initial input string may be referred to as a "password precursor."

In this embodiment, the initial strings are chosen by the respective human users (see users 1, 2 and 3, listed in screenshot 400). Alternatively, these strings could be computer generated, or generated based on predetermined rules (for example, day of one's birthday raised to the power of the number of the month of one's birthday divided by the value corresponding to the animal of one's birth year according to the Chinese calendar).

Processing proceeds to operation S260, where input mod 302 receives a set of operation(s) that can be applied to the first password to change it into a second password for the first user. In this example, each set of operations are determined by the machine logic of input mod 302 itself. Alternatively, they could be provided by human users, like users 1, 2 and 3. In the three user instantiations currently under discussion, the sets of operations are respectively as follows: (U1) reverses character string; (U2) convert to hexadecimal; and (U3) two operations as follows: (a) replace first character with first letter of current month variable, and (b) add day of month (no leading zeroes) to end of initial input string. Notice that the set of operations for user 3 specifies variables (current month value, current day value) for use in performing the operations of the set of operations. It is further noted the operation for U1 is a non-mathematical operation, while the operation for U2 is mathematical. The next sub-section of this Detailed Description section will further discuss a special type of mathematical operations that are called "arithmetic operations."

Processing proceeds to operation S265 where, password calculation mod 304 applies the respectively corresponding set of operation(s) to the first password (or password precursor) to obtain the second password (or, simply, the password). These passwords/second passwords are shown, for users 1, 2 and 3, in screenshot 400.

Processing proceeds to operation S270, where the various users (users 1, 2 and 3 in the three instantiations under discussion) want to be authenticated to use a protected resource. At operation S270, user interface mod 306 presents the user with a login screen.

At operation S275, information from the users is sent back through those respective login screens to user authentication mod 308, and each response will each need to include all passwords that may be required under a given user's profile and/or configuration. This means that users 1 and 2 will each need to enter both their first password and their second password to achieve two-factor authentication. User 3 is on a single password system and sends only the password that was derived from user 3's initial input string.

A NOTE ON USE CASES 1 AND 3. User: 1 (that is, use case 1) represents that the characters of the first password, when a string of reverse logic is applied, becomes the second password. In some embodiments of the present invention, this may not be allowed because this use case may not provide sufficiently strong security. User: 3 (that is, use case 3) represents that "password" can be applied to a set of operations to replace the first character with the first character of the current month and add the day of the current month to the end of the string. In some embodiments of the present invention, this may not be allowed because this use case may not provide sufficiently strong security.

Processing proceeds to operation S280, where authentication mod 308 determines that the user input is indicative of a correct entry of all required passwords. An incorrect entry might prompt an invitation to reenter the authentication information of the like.

Processing proceeds to operation S285, where access grant mod 310, responsive to successful authentication, grants the user access to a protected resource (for example, a protected interactive website hosted on client subsystem 110).

OTHER USE CASES: However just like "User: 2" example of converting "92" to hexadecimal "5C", designers can also include another example of converting a decimal value "10" to binary value as "1010" which becomes the second password. In another example, the designer can also represent applying the binary arithmetic addition operator with an operand "1" applied to each numeric value of the first password "123" becomes "234" as the second password.

III. Further Comments and/or Embodiments

Some embodiments of the present invention recognize the following facts, potential problems and/or potential areas for improvement with respect to the current state of the art where two-factor authentication: (i) relies on two different forms of passwords and, (ii) relies on their input sequence into the system for successful authentication; (iii) it is difficult for a user to memorize the first password and the proxy password symbols; and/or (iv) two-factor authentication relies on two different forms of passwords and their input sequence into the system for successful authentication.

As an example, some embodiments of the present invention recognize the following facts, potential problems and/or potential areas for improvement with respect to the current state of the art: (i) in a typical two-factor authentication process, a user enters a first password (user created); (ii) followed by successful authentication of the first password, an OTP (one time password) is sent to the users registered mobile device or email as a second password for the next and final step of authentication; and/or (iii) this solution has dependency on email and a mobile device for the second password, such as OTP.

In another example, some embodiments of the present invention recognize the following facts, potential problems and/or potential areas for improvement with respect to the current state of the art: (i) a user is prompted to enter the first password and a second password which the user has created during the profile creation, where in this situation, there is an issue in that the user has to remember two different passwords and also has to remember the sequence of the first password and the second password; and/or (ii) during authentication, the sequence of inputting the first password and the second password by the user is important for successful authentication.

According to some embodiments of the present invention, the solution is to have one password. However, a logic of computation like an arithmetic operator is applied on the main password to compute a proxy password. The user is prompted to enter the main password and the proxy password at two different steps of the two-factor authentication. To determine the proxy password, a user will select a main password and will also select a computation logic like arithmetic operator with or an operand to determine the proxy password during the profile creating stage.

To illustrate embodiments of the present invention, consider the following example: (i) the user decides to create the main password as "123"; (ii) the user selects an arithmetic operator like: "Addition" "+"; (iii) the user selects another operand like: "1" (here, the user can select that either the arithmetic addition operator applies to each value of the main password or to the whole main password); and (iv) as an example, the user selects to apply the arithmetic addition to the whole main password where the proxy password that is automatically calculated from the above selections made by the user is: "124", that is, (123+1).

In further embodiments of the present invention, during authentication, the user will be prompted to enter the password in the following steps: (i) the user is prompted to enter the main password that the user has defined in his/her profile; (ii) the user enters "123" as the main password; (iii) the system authenticates the password and proceed to the second step of authentication; (iv) the user is prompted to enter the second password, which is the proxy password that is determined based on the arithmetic operator and the operand that the user has defined in his/her profile; (v) the user enters the proxy password "124"; and (vi) the system then authenticates the proxy password based on the logic of applying the arithmetic operator and the operand on the main password that the user has defined in his/her profile.

Figure 5:
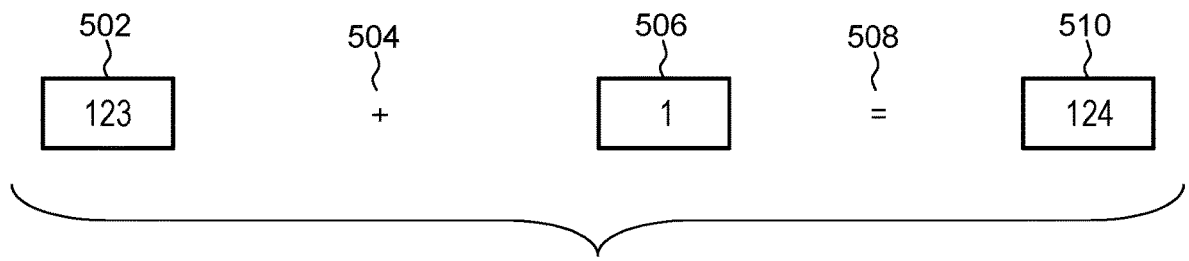
FIG. 5 is a first block diagram of a second embodiment of a system according to the present invention.

The following shows an example of the operations described in the paragraph above and is also shown in FIG. 5, diagram 500:

Main password: 123
Arithmetic operator selected by the user: +(Addition)
The second operand selected by the user: 1
The system logic calculates the proxy password: 123+ 1=124 (proxy password)
The system matches the password that was entered by the user in the second step above with the calculated proxy password.

Some embodiments of the present invention may include one, or more, of the following operations, features, characteristics and/or advantages: (i) the step to enter the main password and then the proxy password, or vice a versa, is implementation independent; and/or (ii) the step to enter the main password and proxy password can be entered in any sequence, that is, it is up to the implementation process to determine which input is the main password and which one is the proxy password without enforcing the sequence of password input from the user.

According to some embodiments of the present invention, the elements of dynamic interpretation of proxy password are: (i) the main password; (ii) a computation method such as an arithmetic operator; (iii) an operand where the user may select an operand when a binary arithmetic operator is selected by the user; and/or (iv) if a unary arithmetic operator is selected, then the second operand is not required.

As shown in FIG. 5, diagram 500 includes: main password block 502; binary arithmetic operator 504; operand block 506; arithmetic symbol 508; and proxy password block 510.

Figure 6:
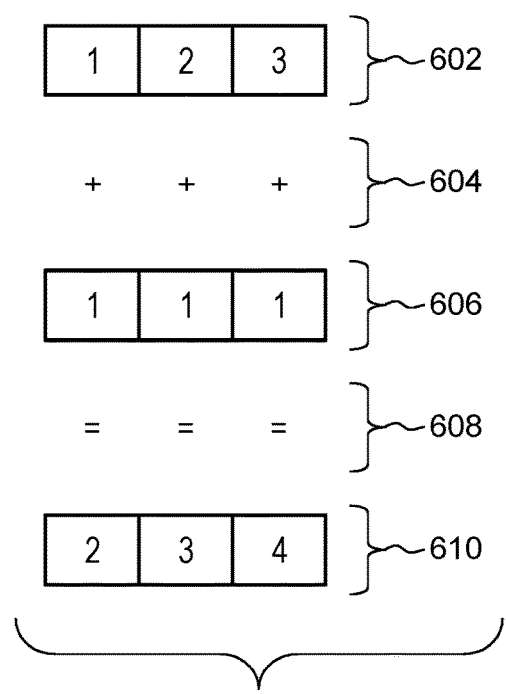
FIG. 6 is a second block diagram of a second embodiment of a system according to the present invention.

As shown in FIG. 6, diagram 600 includes: main password block 602; binary arithmetic operator 604; operand block 606; arithmetic symbol 608; and proxy password block 610.

Figure 7:
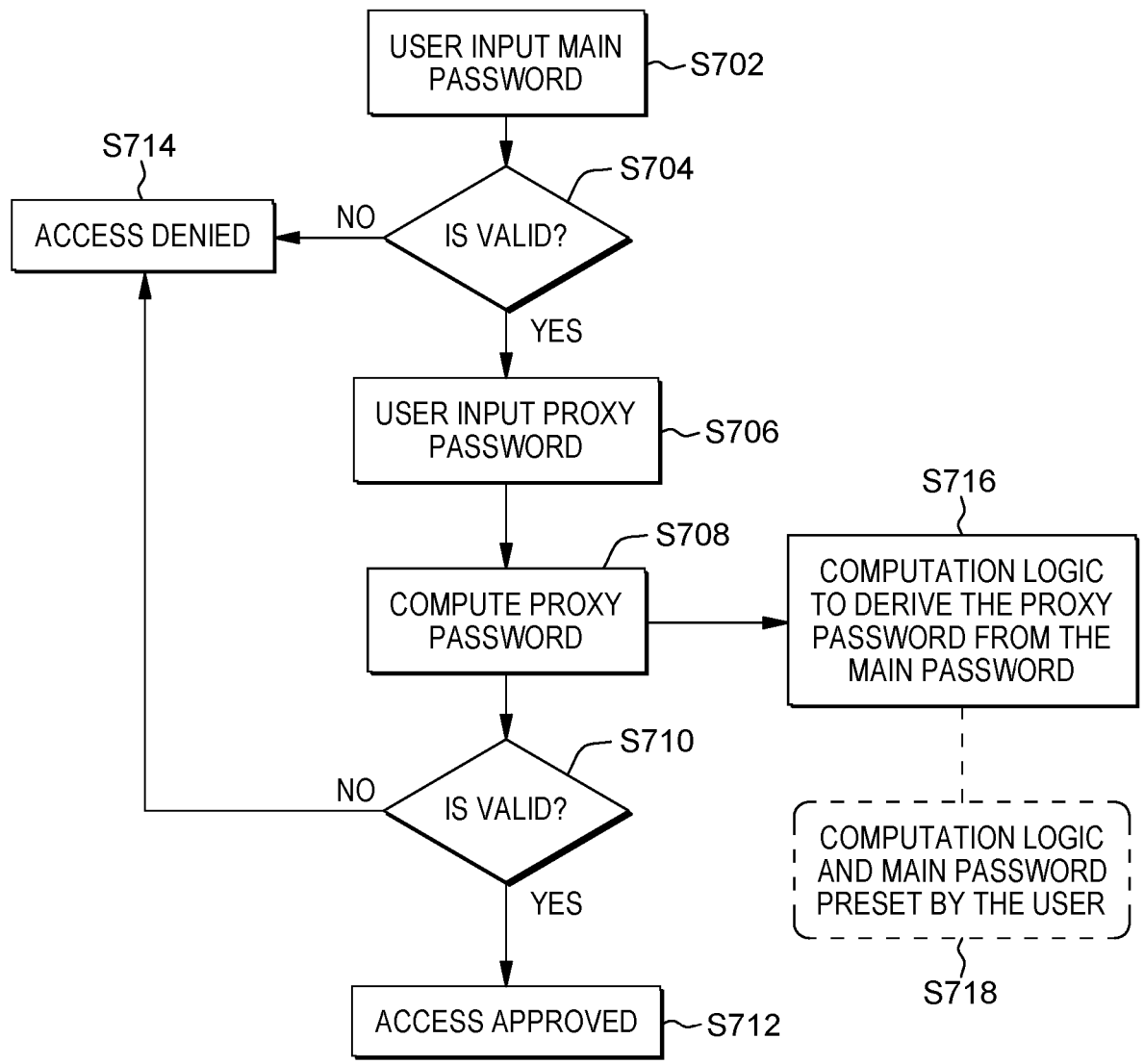
FIG. 7 is a first flowchart showing a second embodiment of method according to the present invention.

As shown in FIG. 7, flowchart 700 includes: user input main password block S702, is valid Yes/No decision block S704; user input proxy password block S706; compute proxy password block S708; is valid Yes/No decision block S710; access approved block S712; access denied block S714; computation logic to derive the proxy password from the main password block S716; and computation logic and main password preset by the user block S718.

Figure 8:
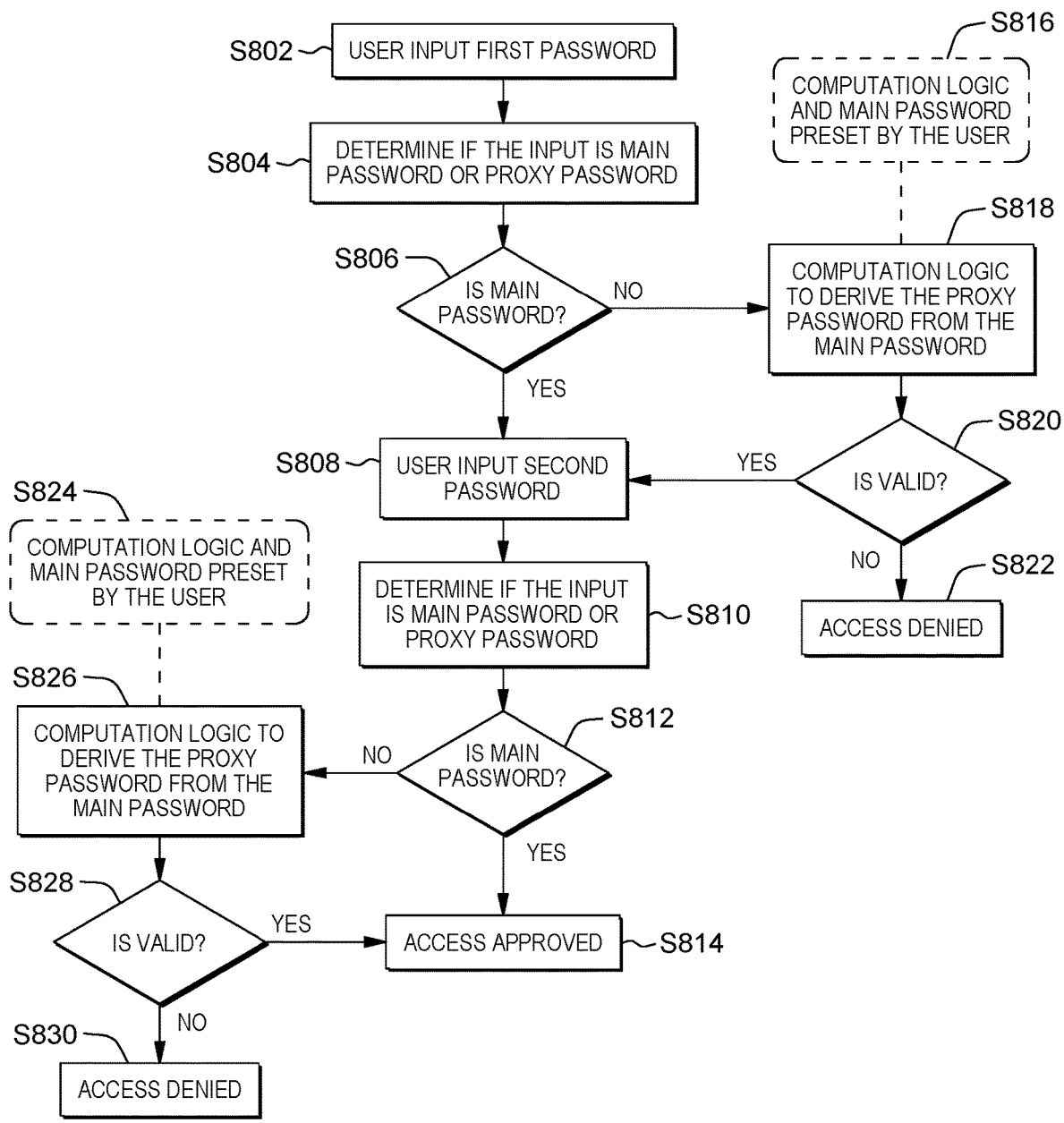
FIG. 8 is a second flowchart showing a second embodiment of method according to the present invention.

FIG. 8 shows flowchart 800 where the sequence/order of entering the first password and the second password is not necessary for successful authentication. Flowchart 800 includes: user input first password block S802; determine if the input is main password or proxy password block S804; is main password Yes/No decision block S806; user input second password block S808; determine if the input is main password or proxy password block S810; is main password Yes/No decision block S812; access approved block S814; computation logic and main password preset by the user block S816; computation logic to derive the proxy password from the main password block S818; is valid Yes/No decision block S820; access denied block S822; computation logic and main password preset by the user block S824; computation logic to derive the proxy password from the main password block S826; is valid Yes/No decision block S828; and access denied block S830.

According to some embodiments of the present invention, two (2) examples will now be described in the following two (2) paragraphs. One example is where the main password has only numeric values, and the second example is where the main password has alpha numeric values. Refer to FIG. 5 and FIG. 6 below. Also note that the operations performed in FIG. 5 and FIG. 6 are similar.

In the first example, assume the main password is only a numeric value where the main password is "123". The binary arithmetic operator selected by the user is "addition" and the user selects the second operand as 1. When both the binary arithmetic operator "addition" and operand "1" are applied to the main password, then the proxy password is calculated as "124". The user can also select to apply the operand "1" and the "addition" operator to each value of the main password. In this case, the password would be "234". This example is also shown in FIG. 6, diagram 600.

In the second example, assume the main password has only alpha numeric values where and the main password is "1a2b3c". During implementation, it is determined whether to apply limited unary arithmetic operators, such as addition/subtraction, only to the numeric values of the main password, and/or categorically with limited operations to increment the current alphabet letter to the next alphabet letter. Assume only a unary (Prefix increment++) operator is applied to the numeric values of the alphanumeric main password ("1a2b3c"). Then after applying the unary prefix "++" operator on each numeric operand of the main password, the resulting proxy password is "2a3b4c".

Some embodiments of the present invention may include one, or more, of the following operations, features, characteristics and/or advantages: (i) the user creates only one password but is challenged for two-factor authentication; (ii) uses a method of multi-factor authentication in which the proxy password/second password is computed based on a computation method at runtime; (iii) the system never stores the proxy password/second password, but it is computed at runtime during the two-factor authentication process; (iv) it is a more secured two-factor authentication in which the proxy password cannot be determined because the system does not store the proxy/second password; (v) a hacker cannot determine which password is the main password and which one is the proxy/second password; (vi) even in the event of leaking the main password, the proxy/second password cannot be determined because it is dependent on the computation method based on which it is derived; and/or (vii) the sequence/order of entering the first password and the second password is not necessary for successful authentication.

Some embodiments of the present invention may include one, or more, of the following operations, features, characteristics and/or advantages: (i) it is a more secure two-factor authentication in which the proxy/second password cannot be hacked because the system never stores it as data, but it is derived from a computation method at runtime during the user authentication process; (ii) this two-factor method is a more challenging method of authentication and is not vulnerable; (iii) this two-factor authentication method can be used in systems which demand high level of security access; (iv) this form of multi-step authentication can be used in commercially available applications; (v) this form of multi-step authentication can be used in commercially available solutions, design, and deployment services; (vi) the method is identifiable because it requires the user to set up a main password and use computational logic, such as arithmetic computation, to derive the proxy/second password; (vii) logic of computation, such as an arithmetic operator, is applied on the main password to compute a proxy password; and/or (viii) the user is prompted to enter the main password and the proxy password at two different steps of the two-factor authentication.

Some embodiments of the present invention may include one, or more, of the following operations, features, characteristics and/or advantages: (i) discloses a method and system for applying a logic of computation (arithmetic operation) on a main password entered by a user to compute/derive a proxy password and prompting the user to enter the main password and the proxy password at two different steps of a two-factor authentication process; (ii) enables a user to select a main password and computation logic, such as an arithmetic operator, with an operand to determine a proxy password/second password during the profile creation stage; (iii) employs a multi-factor authentication in which the proxy password/second password is computed/derived based on the selected computation logic or method during runtime; (iv) the proxy/second password cannot be determined by hackers because the proxy/second password is not stored by the system and is computed only at runtime during the two-factor authentication process; and/or (v) in the event of leaking the main password, the proxy/second password cannot be determined because it is dependent on the computation method based on which it is derived.

Some embodiments of the present invention may include one, or more, of the following operations, features, characteristics and/or advantages: (i) does not depend on any external source for a dynamic changing value to compute a password; (ii) a user defines the first password and computation logic; (iii) based on items (i) and (ii) above, the system computes the second password for a multistep authentication at runtime; (iv) is more secure and reliable because it does not depend on any data from an external network; (v) is more secure because it can work in a private network without requiring any need to connect to external networks; (vi) does not depend on user biometric information but instead lets a user define a custom first level password and computation logic which will operate on the first level password to compute a second level password in a multi-step authentication process; (vii) relies on a first password and computation logic defined by the user; (viii) the system uses item (vii) above to compute a second password by running the computation logic on the first password; (ix) the user has a choice to change the first password and/or the computation logic; and/or (x) periodic changes to first password and/or the computation logic by the user is a more secure method.

Some embodiments of the present invention may include one, or more, of the following operations, features, characteristics and/or advantages: (i) does not have any mechanism of OTP for authentication; (ii) lets a user define a custom first password and computation logic; (iii) during the authentication process, the system will apply the computation logic on the first password to determine the second password; (iv) allows the user to custom select computation logic which will operate on a first level password to derive the second level password in a multi-step authentication process; (v) the second level password in never stored in any database but instead it is computed at runtime by the system; (vi) relies on the first password and different computation logic defined by each different user; (vii) the user has a choice to change the first password and/or the computation logic; and/or (viii) since the computation logic is different for each user, the entire system cannot be hacked by the exposure of one logic.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a first password for a first user, with the first password including numbers, alphanumeric characters and/or non-alphanumeric characters;
receiving a set of operation(s) that can be applied to the first password to change it into a second password for the first user;
applying, by machine logic, the set of operation(s) to the first password to obtain the second password;
presenting a user interface to the first user that prompts the user to enter the first and second passwords as a multi-factor authentication of the first user to access a first protected resource;
receiving user input from the first user through the user interface;
determining whether the user input is the first password or the second password;
responsive to the determination that the user input is of the first password, receiving another input with the second password;
responsive to the determination that the user input is of the second password, receiving another input with the first password;
determining that the user input and the another user input are indicative of a correct entry of the first password and a correct entry of the second password; and
responsive to the determination that the user input and the another user input are indicative of a correct entry of the first password and a correct entry of the second password, allowing the first user access to the first protected resource.

2. The CIM of claim 1 wherein:
the first password is in the form of a number; and
the set of operation(s) is a set of mathematical operation(s).

3. The CIM of claim 2 wherein the set of mathematical operation(s) includes at least one of the following mathematical operations: addition, modular addition, subtraction, modular subtraction, multiplication, division, raising a digit or number to an exponential power, logarithms, operations changing an order of digits and/or changing from a base x number to a base y number.

4. The CIM of claim 1 wherein:
the first password is in the form of a character string; and
the set of operation(s) is a set of string manipulation operation(s).

5. The CIM of claim 1 wherein the first protected resource is in the form of one of the following types: a website, computer data, a computer program, a virtual machine, a container, a physical computer, an IoT (internet of things) device, a virtual data storage device, a physical data storage device and/or a communication network.

6. The CIM of claim 1 wherein the user input is received from the first user in one or more of the following forms: text entry through a keyboard or touchscreen, audio and/or user gestures, and the first and second passwords are implementation independent and the correct entry of the first password and the correct entry of the second password are entered in any sequence.

7. A computer program product (CPP) comprising:
a set of data storage device(s); and
computer code collectively stored on the set of data storage device(s), with the computer code including data and instructions for causing a processor(s) set to perform the following operations:
receiving a first password for a first user, with the first password including numbers, alphanumeric characters and/or non-alphanumeric characters,
receiving a set of operation(s) that can be applied to the first password to change it into a second password for the first user,
applying, by machine logic, the set of operation(s) to the first password to obtain the second password,
presenting a user interface to the first user that prompts the user to enter the first and second passwords as a multi-password authentication of the first user to access a first protected resource,
receiving user input from the first user through the user interface,
determining whether the user input is the first password or the second password;
responsive to the determination that the user input is of the first password, receiving another input with the second password;
responsive to the determination that the user input is of the second password, receiving another input with the first password;

determining that the user input and the another user input are indicative of a correct entry of the first password and a correct entry of the second password, and responsive to the determination that the user input and the another user input are indicative of a correct entry of the first password and a correct entry of the second password, allowing the first user access to a first protected resource.

8. The CPP of claim 7 wherein:

the first password is in the form of a number; and the set of operation(s) is a set of mathematical operation(s).

9. The CPP of claim 8 wherein the set of mathematical operation(s) includes at least one of the following mathematical operations: addition, modular addition, subtraction, modular subtraction, multiplication, division, raising a digit or number to an exponential power, logarithms, operations changing an order of digits and/or changing from a base x number to a base y number.

10. The CPP of claim 7 wherein:

the first password is in the form of a character string; and the set of operation(s) is a set of string manipulation operation(s).

11. The CPP of claim 7 wherein the first protected resource is in the form of one of the following types: a website, computer data, a computer program, a virtual machine, a container, a physical computer, an IoT (internet of things) device, a virtual data storage device, a physical data storage device and/or a communication network.

12. The CPP of claim 7 wherein the user input is received from the first user in one or more of the following forms: text entry through a keyboard or touchscreen, audio and/or user gestures.

13. The CPP of claim 7 further comprising the processor(s) set, wherein the CPP is in the form of a computer system (CS), the set of operation(s) are selected by the first user during profile creation by a system, the second password is never stored by the system, and the first and second passwords are implementation independent and the correct entry of the first password and the correct entry of the second password are entered in any sequence.

14. The CPP of claim 13 wherein:

the first password is in the form of a number; and the set of operation(s) is a set of mathematical operation(s).

15. The CPP of claim 14 wherein the set of mathematical operation(s) includes at least one of the following mathematical operations: addition, modular addition, subtraction, modular subtraction, multiplication, division, raising a digit or number to an exponential power, logarithms, operations changing an order of digits and/or changing from a base x number to a base y number.

16. The CPP of claim 13 wherein:

the first password is in the form of a character string; and the set of operation(s) is a set of string manipulation operation(s).

17. The CPP of claim 13 wherein the first protected resource is in the form of one of the following types: a website, computer data, a computer program, a virtual machine, a container, a physical computer, an IoT (internet of things) device, a virtual data storage device, a physical data storage device and/or a communication network.

18. The CPP of claim 13 wherein the user input is received from the first user in one or more of the following forms: text entry through a keyboard or touchscreen, audio and/or user gestures.

19. A system comprising:

a processor, a computer readable memory, one or more computer readable storage media, and program instructions collectively stored on the one or more computer readable storage media, the program instructions executable to:

assign a first password precursor to a first user, with the first password precursor including numbers, alphanumeric characters and/or non-alphanumeric characters;

assign a set of operation(s) that can be applied to the first password precursor to change it into a first password for the first user;

apply, by machine logic, the set of operation(s) to the first password precursor to obtain the first password, wherein the set of operation(s) are selected by the first user during profile creation by a system, and the first password is never stored by the system;

present a user interface to the first user that prompts the user to enter the first password;

receive user input from the first user through the user interface;

determine whether the user input is the first password or the first password precursor;

responsive to the determination that the user input is of the first password, receiving another input with the first password precursor;

responsive to the determination that the user input is of the first password precursor, receiving another input with the first password;

determining that the user input and the another user input are indicative of a correct entry of the first password and a correct entry of the first password precursor; and responsive to the determination that the user input and the another user input are indicative of a correct entry of the first password and a correct entry of the first password precursor, allowing the first user access to a first protected resource.

20. The system of claim 19 wherein:

the first password precursor is based, at least in part, upon input(s) received from the first user; and the set of operation(s) is based, at least in part, upon inputs received from the first user.

* * * * *